United States Patent

Rohra et al.

[11] Patent Number: 5,274,999
[45] Date of Patent: Jan. 4, 1994

[54] TURBOFAN ENGINE HAVING A CONTRAROTATING LOW-PRESSURE COMPRESSOR

[75] Inventors: Alois Rohra, Munich; Helmut A. Geidel, Karlsfeld, both of Fed. Rep. of Germany

[73] Assignee: MTU Motoren- Und Turbinen-Union Munchen GmbH, Fed. Rep. of Germany

[21] Appl. No.: 907,129

[22] Filed: Jul. 1, 1992

[51] Int. Cl.⁵ .............................................. F02K 3/02
[52] U.S. Cl. ...................................... 60/226.1; 60/268
[58] Field of Search ................... 60/226.1, 268, 39.162

[56] References Cited

U.S. PATENT DOCUMENTS

| | | | |
|---|---|---|---|
| 2,672,726 | 3/1954 | Wolf et al. | 60/226.1 |
| 3,391,540 | 7/1968 | Bauger et al. | 60/39.162 |
| 3,524,318 | 8/1970 | Bauger et al. | 60/39.162 |
| 3,861,139 | 1/1975 | Jones | 60/268 |
| 4,751,816 | 6/1988 | Perry | 60/268 |
| 4,790,133 | 12/1988 | Stuart | 60/226.1 |
| 4,809,498 | 3/1989 | Giffin, III et al. | 60/39.162 |
| 4,860,537 | 8/1989 | Taylor | 60/39.162 |
| 4,947,642 | 8/1990 | Grieb et al. | 60/226.1 |

*Primary Examiner*—Richard E. Gluck
*Assistant Examiner*—Howard R. Richman
*Attorney, Agent, or Firm*—Evenson, Mckeown, Edwards & Lenahan

[57] ABSTRACT

A turbofan engine includes two oppositely rotating fan rotors which are arranged upstream of the core engine, and has a booster with two contra-rotating coaxial rotors. The radially exterior booster rotor is arranged between the rearward fan rotor and the low-pressure turbine in a torque-transmitting manner. The gearless construction permits an almost uniform loading of the low-pressure shafts.

2 Claims, 2 Drawing Sheets

TURBOFAN ENGINE HAVING A CONTRAROTATING LOW-PRESSURE COMPRESSOR

BACKGROUND AND SUMMARY OF THE INVENTION

This invention relates to a propfan engine and, more particularly, to a propfan engine having two oppositely rotating fan rotors; a gas turbine whose low-pressure turbine has two contra-rotating turbine rotors which drive the fan rotors by way of two coaxial turbine shafts, and a multi-stage low-pressure compressor, i.e., a booster, which has contra-rotating concentric booster rotors.

Previously known solutions of two-stage contra-rotating fan engines, particularly propfan engines, are constructed either with transmissions which transmit the whole power supplied by the low-pressure turbine and carry out the power distribution to the fan rotors, or each of the two fan stages is driven by a separate shaft.

The use of a low-pressure compressor, i.e., a booster, which is arranged upstream of the gas turbine in the primary circuit for increasing the thrust, does not present any problems in the case of transmission solutions because it may easily be mounted on the low-pressure turbine shaft. The transmission itself, which is usually constructed as a differential transmission—that is, the drive of the rearward fan stage takes place by way of ring gear, and that of the forward fan stage takes place by way of the sun wheel—represents a high technical challenge. In addition, this type of transmission requires high rotational speeds of the low-pressure turbines because the transmission ratio of such transmissions cannot be constructed to be significantly below i=4.0 to 4.5. According to the size of the fan diameter, this leads to rotational speeds of above 8,000 r.p.m. for the low-pressure turbine, which is feasible aerodynamically, but presents problems technically.

In addition to the use of a transmission, the direct drive of the two fan stages, by way of two shafts, is another possibility for solving the problem. In this case, a multi-rotor low pressure turbine is a prerequisite, the rotors of which are arranged either behind one another or are contra-rotating inside one another. In this case, the turbine, whose rotors are arranged behind one another, has a very long construction.

The most compact construction is a contra-rotating lower pressure turbine where the rotors are arranged inside one another, as disclosed in the German Patent Document DE-38 12 027 A1. The drive of the low-pressure compressor arranged between the fan rotors and the gas turbine, in this case, takes place by a fan rotor shaft by way of a transmission. The shafts are therefore loaded to a different extent. However, the additional transmission increases the weight and requires additional maintenance expenditures.

In contrast, in the German patent Document DE-37 28 436 A1, a gearless contra-rotating low pressure compressor is disclosed which is arranged between the two fan rotors. In this arrangement, however, there is no increase in protection of the second rotor against the effect of foreign bodies, such as encounters with birds, because the air inlet of the core engine must be arranged in front of the rearward fan rotor. Another disadvantage is the necessarily larger hub ratio of the rearward fan rotor.

Based on the above, there is needed a propfan engine of the above-mentioned type having a contra-rotating booster compressor driven by the low-pressure turbine without the use of a transmission, and the hub ratio of the fan rotors is not affected disadvantageously. A maximal protection of the primary circuit must be ensured against the effect of foreign bodies.

According to the invention, this need is met in that the low-pressure compressor is arranged coaxially between the fan rotors and the gas turbine. A radially interior booster rotor is connected with the radially interior turbine shaft. A radially exterior booster rotor is connected on the fan-rotor-side, by way of the row of blades of the first booster stage, with the fan rotor that is second in the flow direction. On the gas-turbine-side, the radially exterior booster rotor, by way of the row of blades of the last booster stage, is connected with the radially exterior low-pressure turbine shaft, and the air inlet of the gas turbine being arranged downstream of the fan rotors.

The arrangement according to the invention has the advantage of uniformly loading the driving turbine shafts by the arrangement of the contra-rotating booster rotors in the transmission line between the fan rotors, on the one side, and the gas turbine, on the other side, while the overall length of the booster is short. An optimal protection against the effect of foreign bodies on the core engine and on the booster is provided by the fact that both fan rotors are arranged upstream of the air inlet to the primary circuit and sucked-up foreign bodies are therefore deflected from the inlet by two fan rotors. In addition, the hub ratio in the area of the fan rotors may be kept small because the booster is arranged downstream of the rearward fan rotor. As a result, the required engine diameter is correspondingly reduced.

Another embodiment of the present invention permits a high compression ratio while the size of the booster is compact since the contra-rotating capacity of the booster rotors ensures high compression ratios also when the rotational speed is low.

Other objects, advantages and novel features of the present invention will become apparent from the following detailed description of the invention when considered in conjunction with the accompanying drawings.

DETAILED DESCRIPTION OF THE DRAWINGS

Figure 1:
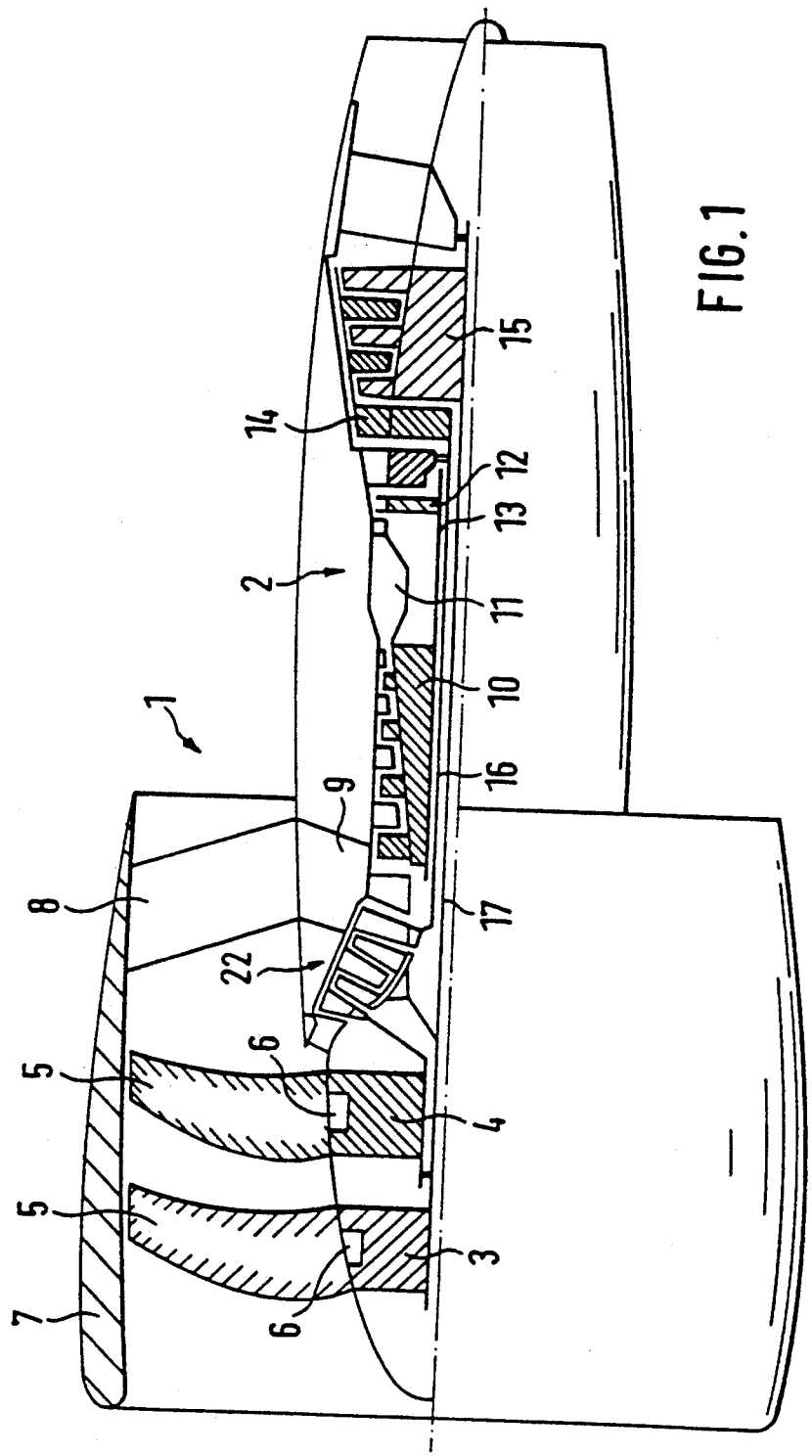
FIG. 1 is a partial sectional view of a propfan engine.

Referring to FIG. 1, the propfan engine 1 comprises a gas turbine 2 and two fan rotors 3 and 4 which are arranged upstream of the gas turbine 2 and at which fan blades 5 are mounted which are distributed along the circumference of the rotors 3, 4. The fan blades 5 are pivotally disposed by way of adjusting devices 6 which are not shown in detail. A shroud 7 is provided radially outside the fan blades 5. The shroud 7 extends in the engine-axial direction. By way of a number of regularly spaced ribs 8, the shroud 7 is mounted on the engine housing 9 of the gas turbine 2.

The gas turbine 2 essentially comprises a high-pressure compressor 10, a combustion chamber and a high-pressure turbine 12. The high pressure turbine 12 drives the high-pressure compressor 10 by means of a high-pressure turbine shaft 13. Downstream of the high-pressure turbine 12, a working turbine with two contra-rotating turbine rotors 14 and 15 is arranged, the turbine rotors 14 and 15 driving the fan rotors 4 and 3 as well as the booster rotors 18 and 19 by way of two mutually coaxial turbine shafts 16 and 17 which extend radially inward of the high-pressure turbine shaft 13 in the longitudinal direction of the engine. For this purpose, the rows of turbine blades of the turbine rotors 14 and 15, for each rotor, are arranged alternately behind one another.

Figure 2:
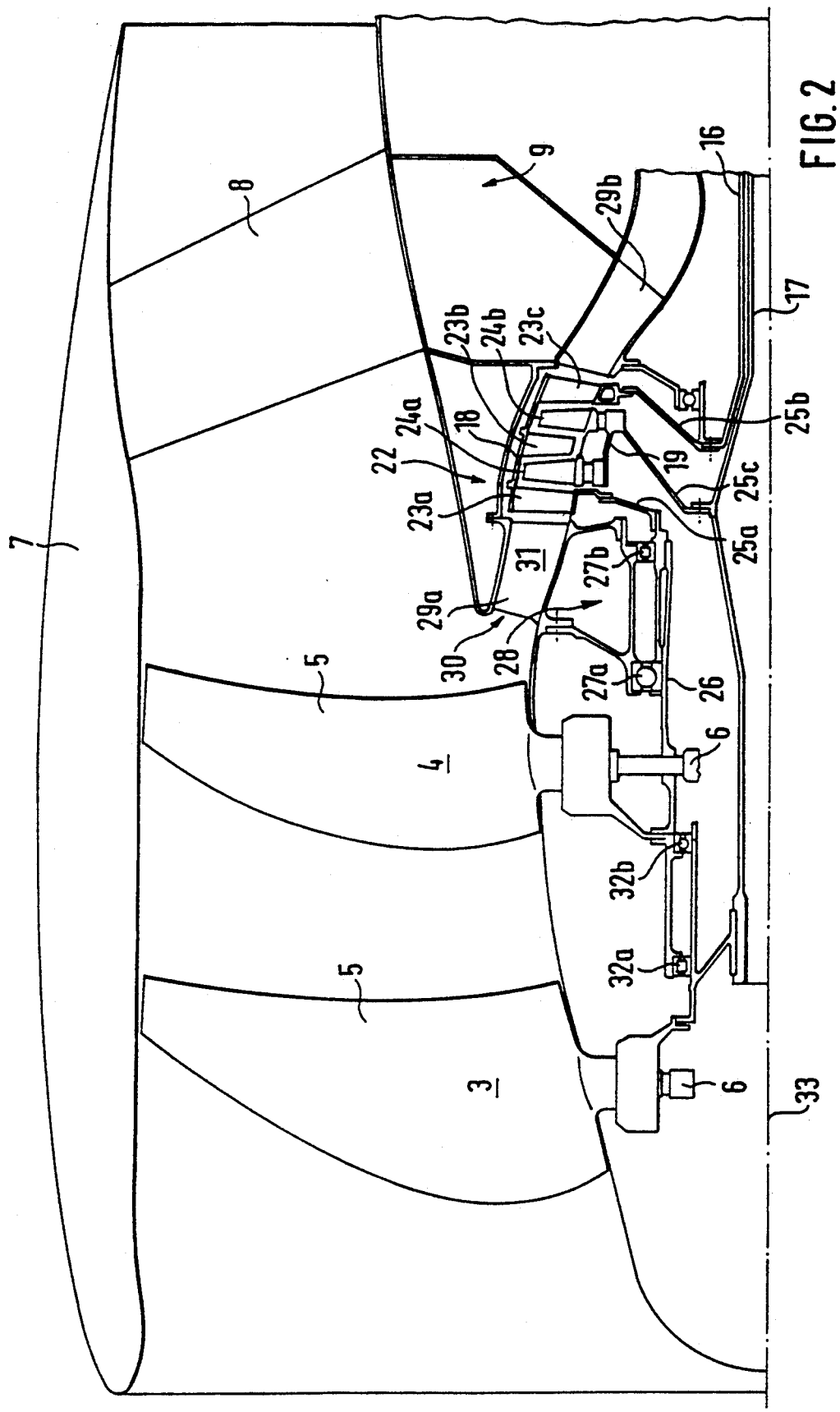
FIG. 2 is a cut-out view of a propfan engine with two fan rotors and boosters.

As indicated in FIG. 2, the five-stage low-pressure compressor (booster) 22 arranged axially between the rearward fan rotor 4 and the gas turbine 2 has a construction with two contra-rotating rotors. The two booster rotors 18 and 19 are arranged concentrically with respect to one another, their rows of blades, for each rotor, being arranged alternately behind one another. The radially exterior booster rotor 18 has three rows of blades 23a, b and c, their blades being fastened radially on the outside to the booster rotor and extending radially toward the inside to the interior booster rotor 19. In contrast, the two rows of blades 24a and b of the interior booster rotor 19 extend radially toward the outside to the exterior booster rotor 18. The primary duct 31 in the area of the booster 22 is therefore radially bounded by the booster rotors 18 and 19.

For the power transmission from the turbine rotors 14 and 15 to the booster rotors 18 and 19 and the fan rotors 4 and 3, the radially exterior turbine shaft 16, by way of an intermediate cone 25b, is connected with the last row of blades 23c, and the fan rotor 4, which is in the rearward with respect to the flow direction, by way of an intermediate shaft 26 and a forward intermediate cone 25a, is connected with the first row 23a of blades. The radially exterior booster rotor 18, having its rows of blades 23a and 23c which are first and last with respect to the flow direction, is therefore constructed to be torque-transmitting. The forward fan rotor 3 is driven directly by way of the radially interior turbine shaft 17. An intermediate cone 25c creates a connection to the drive of the interior booster rotor 19.

For the transmission of the fan rotor loads to the engine housing 9, the intermediate shaft 26 is disposed between the rearward fan rotor 4 and the exterior booster rotor 18 by means of a fixed bearing 27a and a movable bearing 27b on the intermediate housing 28. The intermediate housing 28 is connected with the engine housing 9 by way of struts 29a, while bypassing the booster 22. For this purpose, the struts 29 penetrate the air inlet 30 of the primary duct 31 upstream of the booster 22. With respect to the flow direction, the air inlet 30 proper is arranged between the rearward fan rotor 4 and the booster 22.

By way of intermediate bearings 32a and 32b, the forward fan rotor 3 is disposed on the intermediate shaft 26 which extends in the longitudinal direction of the engine to the first fan rotor 3.

For introducing the booster loads into the engine housing 9, the exterior booster rotor 18, by way of the booster-side bearings 27a and 27b is disposed on the intermediate housing 28, on the one side, and, on the other side, in the area of the fastening point of the rearward intermediate cone 25b on the exterior turbine shaft 16, is disposed on the engine housing 9 by way of struts 29b.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A turbofan engine, comprising:
   two oppositely rotating fan rotors, a first fan rotor being located upstream of a second fan rotor in the air flow direction;
   a gas turbine having a low-pressure turbine part with two contra-rotating turbine rotors driving the two fan rotors through two coaxial turbine shafts;
   an air inlet for the gas turbine arranged downstream of the two fan rotors,
   a multi-stage low-pressure compressor, having contra-rotating booster rotors, arranged coaxially with the turbine shafts between the two fan rotors and the gas turbine, and concentrically to each other;
   wherein a radially interior one of said concentric booster rotors is connected with a radially interior one of said coaxial turbine shafts, and
   wherein a radially exterior one of said concentric booster rotors is connected on a fan rotor side of the turbofan engine with the second fan rotor via a row of blades of a first booster stage of the multi-stage low pressure compressor and, on a gas turbine side of the turbofan engine, the radially exterior one of said concentric booster rotors is connected with a radially exterior one of said coaxial shafts via a last row of blades of a last booster stage of the multi-stage low pressure compressor for power transmission from the low pressure turbine to the second fan rotor.

2. A turbofan engine according to claim 1, wherein each rotor of the low-pressure compressor has its row of blades arranged interdigitaly with one another, and wherein the blades of the radially exterior rotor extend radially toward the inside of said engine, and those of the radially interior rotor extend radially toward the outside of said engine.

* * * * *